United States Patent [19]

Farcasiu et al.

[11] 4,329,221

[45] May 11, 1982

[54] UPGRADING OF HYDROCARBON FEEDSTOCK

[75] Inventors: Malvina Farcasiu, Princeton; Thomas O. Mitchell, Trenton; Darrell D. Whitehurst, Titusville, all of N.J.

[73] Assignee: Mobil Oil Corporation, New York, N.Y.

[21] Appl. No.: 186,926

[22] Filed: Sep. 12, 1980

[51] Int. Cl.$^3$ .................. C10G 45/04; C10G 45/30
[52] U.S. Cl. ........................ 208/214; 208/251 H; 208/254 H
[58] Field of Search ............... 208/214, 251 H, 251 R, 208/254 H, 254 R

[56] References Cited

U.S. PATENT DOCUMENTS

| | | | |
|---|---|---|---|
| 2,591,525 | 4/1952 | Engel et al. | 208/214 |
| 2,717,855 | 9/1955 | Nicholson | 208/251 H |
| 2,766,054 | 10/1973 | Weisz et al. | 208/251H |
| 2,987,470 | 6/1961 | Turken | 208/253 |
| 3,530,066 | 9/1970 | Kuwata et al. | 208/210 |
| 3,716,479 | 2/1973 | Weisz et al. | 208/251 H |
| 3,772,185 | 11/1973 | Chang et al. | 208/251 H |
| 3,936,371 | 2/1976 | Ueda et al. | 208/251 H |

*Primary Examiner*—Delbert E. Gantz
*Assistant Examiner*—Olik Chaudhuri
*Attorney, Agent, or Firm*—Charles A. Huggett; Michael G. Gilman; Charles J. Speciale

[57] ABSTRACT

This invention provides a process for reducing the metal, sulfur and nitrogen content of petroleum residual oils. The process involves contacting a mixture of hydrocarbon feedstock and hydrogen-donor solvent with a catalyst composition comprising a naturally occuring porous metal ore such as manganese nodules.

17 Claims, No Drawings

UPGRADING OF HYDROCARBON FEEDSTOCK

BACKGROUND OF THE INVENTION

Various hydrocarbon feedstocks such as crude petroleum oils, topped crudes, heavy vacuum gas oils, shale oils, tar sand bitumens, and other heavy hydrocarbon fractions such as residual fractions and distillates contain varying amounts of non-metallic and metallic impurities. The non-metallic impurities include nitrogen, sulfur, and oxygen and these exist in the form of various compounds and are often in relatively large quantities. The most common metallic impurities include iron, nickel, and vanadium. Other metallic impurities including copper, zinc, and sodium are often found in various hydrocarbon feedstocks and in widely varying amounts. The metallic impurities may occur in several different forms as metal oxides or sulfides which are easily removed by simple processing techniques such as by filtration or by water washing. However, the metal contaminants also occur in the form of relatively thermally stable organo-metallic complexes such as metal porphyrins.

Residual petroleum oil fractions produced by atmospheric or vacuum distillation of crude petroleum are characterized by relatively high metals and sulfur content. This occurs because substantially all of the metals present in the original crude remain in the residual fraction, and a disproportionate amount of sulfur in the original crude oil also remains in that fraction.

The high metals content of the residual fractions generally preclude their effective use as charge stocks for subsequent catalytic processing such as catalytic cracking and hydrocracking, because the metal contaminants deposit on the special catalysts for these processes and cause the formation of inordinate amounts of coke, dry gas and hydrogen.

It is current practice to upgrade certain residual fractions by a pyrolitic operation known as coking. In this operation the residuum is destructively distilled to produce distillates of low metals content and leave behind a solid coke fraction that contains most of the metals. Coking is typically carried out in a reactor or drum operated at about 800°-1100° F. temperature and a pressure of 1-10 atmospheres. The economic value of the coke byproduct is determined by its quality, particularly its sulfur and metals content. Excessively high levels of these contaminants makes the coke useful only as low-valued fuel. In contrast, cokes of low metals content, for example up to about 100 ppm (parts per million by weight) of nickel and vanadium, and containing less than about 2 weight percent sulfur may be used in high-valued metallurgical, electrical, and mechanical applications.

Certain residual fractions are currently subjected to visbreaking, which is a heat treatment of milder conditions than used in coking, in order to reduce their viscosity and make them more suitable as fuels. Again, excessive sulfur content sometimes limits the value of the product.

Presently, catalytic cracking is generally accomplished by utilizing hydrocarbon charge stocks lighter than residual fractions which usually have an API gravity less than 20. Typical cracking charge stocks are coker and/or crude unit gas oils, vacuum tower overhead, and the like, the feedstock having an API gravity from about 15 to about 45. Since these cracking charge stocks are distillates, they do not contain significant proportions of the large molecules in which the metals are concentrated. Such cracking is commonly carried out in a reactor operated at a temperature of about 800°-1500° F., a pressure of about 1-5 atmospheres, and a space velocity of about 1-1000 WHSV.

Conventionally, a distillate feedstock contains low metals contents (less than 100 ppm) and is considered particularly suitable for catalytic cracking.

The residual fractions of typical crudes will require treatment to reduce the metals contents. As almost all of the metals are combined with the residual fraction of a crude stock, at least about 80 percent of the metals and preferably at least 90 percent needs to be removed to produce fractions suitable for cracking charge stocks. As an example, a typical Arabian residue, considered of average metals content, contains 68 ppm vanadium and 17 ppm nickel.

Metals and sulfur contaminants present similar problems with regard to hydrocracking operations which are typically carried out on feedstocks even lighter than those charged to a cracking unit. Hydrocracking catalyst is so sensitive to metals poisoning that a preliminary or first stage is often utilized for trace metals removal. Typical hydrocracking reactor conditions consist of a temperature of 400°-1000° F. and a pressure of 100-3500 psig.

The economic and environmental factors relating to upgrading of petroleum residual oils and other heavy hydrocarbon feedstocks have encouraged efforts to provide improved processing technology, as exemplified by the disclosures of various United States patents.

U.S. Pat. No. 3,716,479 describes a process for the demetalation of a hydrocarbon charge stock containing metal impurities which involves contacting the hydrocarbon charge stock with hydrogen and with a catalyst comprising the naturally-occurring underwater deposit known as manganese nodules.

U.S. Pat. No. 3,839,187 describes a process for removing metal contaminants from a petroleum residual oil without significant coking and loss of hydrocarbons by treating such oils with a hydrogen donor solvent in the presence of a highly porous inorganic scrubbing agent such as clay, and recycling the regenerated metal-containing scrubbing agent.

U.S. Pat. No. 3,847,798 discloses a means for reducing the sulfur content of hydrocarbon material by oxidizing the sulfur impurities contained in the hydrocarbon material and then contacting the oxidized sulfur-containing hydrocarbon material with at least one hydrocarbon hydrogen donor component capable of transferring hydrogen under conditions such that hydrogen transfer from said component to the oxidized sulfur-containing hydrocarbon material occurs.

U.S. Pat. No. 3,901,792 describes a multi-zone method for demetalizing and desulfurizing crude oil or atmospheric residual oil. An initial contact stage contains a material having extensive macroporosity and is operated as an ebullated bed under optimum demetalation conditions. This is followed by a removal of effluent vapors and a further ebullated bed contact of the liquid with a highly active hydrodesulfurization catalyst.

U.S. Pat. No. 3,905,893 discloses a hydrodesulfurization and demetalation process which involves an initial stage having relatively high hydrogen pressure in the presence of a catalyst comprising a relatively low proportion of catalytically active hydrogenation metals.

The process employs a final stage in series having a relatively lower hydrogen pressure and a catalyst comprising a relatively higher proportion of hydrogenation metals.

U.S. Pat. No. 3,936,371 discloses a method for removing vanadium, nickel, sulfur and asphaltenes from hydrocarbon oils which involves contacting the hydrocarbon oil with red mud having from 18–25 percent by weight aluminum oxide, 15–20 percent by weight silicon dioxide, 30–40 percent by weight ferric oxide, 2–8 percent by weight titanium dioxide, and 8–12 percent by weight of matter that is lost by ignition, at elevated temperatures and in the presence of hydrogen.

U.S. Pat. No. 3,964,995 discloses a two-stage hydrodesulfurization process for a 65–80 percent desulfurization of a high metals content residuum. The first stage contains porous alumina contact material activated with at least one promoter oxide. The second stage contains a highly active desulfurization catalyst of limited porosity.

U.S. Pat. No. 3,985,643 describes an improved process for desulfurization of metals and sulfur-containing petroleum oils, which involves passing a petroleum oil through a bed of substantially aged desulfurization catalyst at a temperature not less than 770° F. preceeding conventional hydrodesulfurization treatment.

Other United States patents which relate to desulfurization, demetalation and denitrification of heavy hydrocarbon oils include U.S. Pat. Nos. 2,591,525; 2,761,816; 2,909,476; 2,921,022; 2,950,231; 2,987,470; 3,094,480; 3,594,312; 3,663,434; 3,676,369; 3,696,027; 3,766,054; 3,772,185; 3,775,303; 3,813,331; 3,876,530; 3,882,049; 3,897,329; and the like, and references cited therein.

There is continuing research effort to improve the efficiency of processing means for upgrading of hydrocarbon feedstocks, with particular reference to petroleum residual oils.

Accordingly, it is an object of this invention to provide an improved catalytic process for reducing the sulfur, metal and nitrogen content of hydrocarbon oils.

It is another object of this invention to provide a process for upgrading heavy hydrocarbon feedstocks, in the presence of a relatively inexpensive catalyst and without the addition of hydrogen gas.

Other objects and advantages of the present invention shall become apparent from the accompanying description and illustrated data.

DESCRIPTION OF THE INVENTION

One or more objects of the present invention are accomplished by the provision of a process for reducing the metal, sulfur and nitrogen content of hydrocarbon feedstock which comprises contacting a mixture of hydrocarbon feedstock and hydrogen donor solvent in the absence of added hydrogen with a catalyst composition comprising a naturally occurring porous metal ore selected from the group consisting of manganese nodules, bog iron, bog manganese, nickel laterites and bauxite.

In one of its particular embodiments, this invention provides a catalytic process for reducing the metal, sulfur, nitrogen and Conradson Carbon Residue content of a heavy hydrocarbon feedstock which comprises (1) admixing a heavy hydrocarbon oil with a hydrogen donor solvent in a weight ratio between about 0.2–10 of hydrogen donor solvent to hydrocarbon oil, and (2) contacting the admixture with a catalyst composition at a temperature between about 600°–1000° F. for a period between about 0.1–3 hours, wherein the said catalyst composition comprises a naturally occurring porous metal ore selected from the group consisting of manganese nodules, bog iron, bog manganese, nickel laterites and bauxite.

The term "heavy hydrocarbon oil" is meant to include petroleum oil residua, shale oil, and tar sand bitumen feedstocks, in which mixtures at least 75 weight percent of the constituents have a boiling point above about 650° F.

Typically, a heavy hydrocarbon oil suitable for treatment in accordance with the present invention has a sulfur content of at least 3 weight percent, a metals content of at least 80 ppm, a nitrogen content of at least 0.2 weight percent, and a Conradson Carbon Residue content of at least 10 weight percent.

The hydrocarbon feedstock which is to be treated in accordance with the present invention process to reduce its metal and/or sulfur and/or nitrogen and/or Conradson Carbon Residue (CCR) content is blended first with a hydrogen donor solvent. The weight ratio of solvent to feedstock in the admixture will vary in the range between about 0.2–10, and preferably in the range between about 0.5–5.

The term "hydrogen donor solvent" includes any organic medium which is capable of transferring hydrogen to the hydrocarbon feedstock component under the present invention processing conditions. Illustrative of hydrogen donor solvents are mixed naphthenic-aromatic condensed ring compounds having up to about 40 carbon atoms per molecule, such as indane, $C_{10}$ to $C_{12}$ tetralins, di-, tetra-, and octa-hydroanthracene, $C_{12}$ and $C_{13}$ acenaphthenes, tetrahydroacenaphthene as well as partially hydrogenated condensed aromatic ring compounds such as anthracene, chrysene, benzopyrene, fluorenthene, phenanthrene, pyrene and triphenylene, benzoanthracene, benzophenanthrene, and the like; aromatic compounds containing from about 13 to about 26 carbon atoms per molecule and having at least one alkyl substituent containing from about 7 to about 20 carbon atoms.

A preferred type of hydrogen donor solvent is that described in U.S. Pat. No. 4,151,066, incorporated herein by reference. This type of solvent has a hydrogen content distribution in which the $H_{Ar}$ proton content is between about 30 and 50 percent, the $H_\alpha$ proton content is at least about 30 percent and the $H_\alpha/H_\beta$ proton ratio is above about 1.4. Concomitantly it is desirable that the $H_\beta$ proton content is below 20 percent and the $H_\gamma$ proton content is below 13 percent. It is preferred that the hydrogen donor solvent is a highly aromatic refinery petroleum residuum solvent having the above hydrogen content distribution, and especially preferred that the highly aromatic refinery petroleum residuum solvent is selected from the group consisting of FCC main column bottoms and TCC syntower bottoms (i.e., hydrocrackate bottoms).

Also useful are hydrogen donor solvents produced in coal processing systems, e.g., an intermediate fraction boiling between 350° F. and about 900° F., preferably between about 400° F. and 800° F., derived from a coal liquefaction process. Fractions of this type comprise hydrogenated aromatics, naphthenic hydrocarbons, phenolic materials and similar compounds, and contain at least 30 weight percent up to 50 weight percent of compounds which are known to be hydrogen donors (e.g., as described in U.S. Pat. No. 3,841,991).

Other hydrogen-donating solvents may be employed in addition to petroleum or coal derived solvents. Such materials include water miscible and immiscible lower aliphatic alcohols such as methanol, ethanol, propanol, isopropanol, butanol, pentanol, hexanol; cycloaliphatic alcohols such as cyclohexanol; and the like.

In the present invention process, the hydrogen donor solvent can be regenerated externally by conventional means, e.g., catalytic hydrogenation, and may be recycled if desired. Optionally, hydrogen gas can be introduced into the reaction system either continuously or at least intermittently during the process.

As noted previously, the invention process is conducted in the presence of a specifically defined type of catalyst composition. A main advantage of the invention process is the discovery that hydrocarbon feedstock can be upgraded by the use of an abundantly available naturally occurring catalytic material, i.e., porous metal ore such as manganese nodules, bog iron, bog manganese, nickel laterites or bauxite. Such materials are readily available in large quantities and are relatively inexpensive. Further, such ores are capable of effective desulfurization and denitrogenation as well as metallic impurity removal from a hydrocarbon feedstock, especially a petroleum residual oil. When the porous catalyst material becomes fouled and inactivated in the process, such materials can be discarded without significant effect on the economics of the process because of their low cost.

"Manganese nodules" are naturally occurring deposits of manganese (along with other metals such as iron, cobalt, nickel and copper) found on the floor of bodies of water. They are found in abundance on the floor of oceans and lakes such as the Atlantic and Pacific Oceans and Lake Michigan. The nodules are characterized by a large surface area, i.e., in excess of 150 square meters per gram. Their color varies from earthy black to brown depending upon their relative manganese and iron content. The nodules are porous and light, having an average specific gravity of about 2.4. Generally, they range from ⅛ to 9 inches in diameter but may extend up to considerably larger sizes approximating 4 feet in length and 3 feet in diameter and weighing as much as 1700 pounds. In addition to the metals mentioned above, the nodules contain silicon, aluminum, calcium and magnesium, and small amounts of molybdenum, zinc, lead, nickel, vanadium, and rare earth metals.

The chemical and physical properties of manganese nodules are relatively unique for the catalytic desulfurization of hydrocarbon feedstocks. The nodules have a high surface area, about 150-250 square meters per gram. The surface area is diminished by metal deposition during the desulfurization reaction. Further, as shown by Roger G. Burns and D. W. Fuerstenau in American Mineralogist, vol. 51, 1966, pp. 895-902, "Electron-Probe Determination of Inter-Element Relationships in Manganese Nodules," the concentrations of the various metals contained in the nodules (i.e., the manganese, iron, cobalt, copper and nickel) are not uniform throughout the crystalline structure of the nodule. A traverse across a section of a nodule indicates marked differences in the concentrations of the various metals from point to point of the traverse.

The manganese nodules can be empoloyed as the catalyst for the desulfurization/demetalation/denitrogenation of the hydrocarbon feedstock substantially as recovered from the floor of the body of water in which they occur, preferably after washing to remove mud or other loose material from the surface of the nodules.

The process of the invention may also be conducted with manganese nodules which have been subjected to a pretreatment, e.g., a sulfiding or leaching pretreatment to remove or reduce the content of one or more metallic components of the nodules.

Sulfiding of the manganese nodules can increase the extent of demetalation of a hydrocarbon feedstock. It also can increase the extent of desulfurization and Conradson Carbon Residue (CCR) reduction, each of which is desirable. This treatment usually is performed by contacting the nodules with hydrogen sulfide. The hydrogen sulfide may be either pure or mixed with other gases, but preferably a hydrogen sulfide stream substantially free of hydrogen is employed. The temperature of sulfiding can vary in the range between about 300°-450° F., for a period of time between about 4-8 hours. The sulfiding may be effected, for example, by passing the hydrogen sulfide over the manganese nodules continuously during the sulfiding reaction.

The manganese nodules may be pretreated by being subjected to leaching to reduce the content of one or more components. As mentioned previously, the manganese nodules nominally contain copper, nickel and molybdenum constituents. The manganese nodules can be pretreated to leach therefrom the copper and/or nickel and/or molybdenum. The manganese nodules contain the copper, nickel and molybdenum in sufficient quantities to provide a commercial source of these metals. Further, the removal of these secondary metallic constituents from the manganese nodules has apparently no deleterious effect on the catalytic activity of the nodules for the purposes of the present invention. Thus, copper, nickel, molybdenum and other metals may be recovered from the nodules for the economic advantage to be gained by such recovery, and the residual bulk of the manganese nodules can then be employed as a catalyst composition.

Removal of the copper and the nickel may be effected by leaching the manganese nodules with an aqueous solution of a strong acid, such as hydrochloric acid, sulfuric acid or nitric acid.

The molybdenum may be removed from the manganese nodules by leaching them with aqueous base solutions such as aqueous solutions of sodium hydroxide or sodium carbonate. These solutions should have a pH of at least 8, and preferably should have a pH of at least 10. The leaching with the aqueous base solutions can be performed at ambient temperatures or at the boiling point of the solution.

The manganese nodules, with or without pretreatment, may be crushed and sized to obtain a desired particle size for the type of operation being employed (e.g., a fixed bed, an ebullated bed, and the like).

The catalyst, after being employed and having become catalytically deactivated or spent, can be treated for recovery of valuable metals such as copper, nickel, molybdenum, and the like. It may also be treated to recover any other component.

Another naturally occurring porous metal ore which can be employed for the present invention desulfurization/demetalation/denitrogenation process is the loosely aggregated ore obtained from marshy ground which is known as bog iron. Bog iron is a variety of limonite, a naturally occurring hydrated oxide of iron ($2Fe_2O_3.3H_2O$) which contains about 60 weight percent iron. It is yellow to brown in color and has been formed by the alteration of other iron minerals, e.g., by oxidation and/or hydration. Bog iron is a common and important ore found in the United States and Europe. It is amorphous and is characterized by a surface area in excess of 10 square meters per gram, a hardness (Mohs) of about 5–5.5, and an average specific gravity of about 3.6–4.

The bog iron can be employed substantially as mined, but preferably is washed with hot water to remove mud and other loose material. The iron is then crushed, dried to a constant weight and sieved to 10–20 mesh (U.S. Series). If desired, the bog iron may be leached and/or sulfided in the manner indicated above for manganese nodules.

Bog manganese is another naturally occurring porous metal ore which can be used. This ore may also be pretreated by leaching and/or sulfiding. Bog manganese is similar to bog iron and consists mainly of oxide of manganese and water, with some oxide of iron, and often silica, alumina and baryta. It is amorphous, and has a surface area greater than 10 square meters per gram, a hardness (Mohs) of about 6 and a specific gravity of about 3.0–4.26. Bog manganese is not regarded as representing a distinct mineral species from psilomelane, a colloidal manganese oxide with various adsorbed impurities. Bog manganese occurs in Europe and is associated with the Lake Superior hematite deposits in Michigan.

Other suitable ores having a surface area in excess of 10 square meters per gram which can be employed include nickel bearing laterite ores and bauxite. Also included is spent bauxite or the red mud by-product obtained in the Bayer process of manufacturing aluminum from bauxite. Lateritic nickel ores of the silicate type, such as the usual laterites and garnierites, are found in southeast Asia, Cuba, Czechoslavakia, New Caledonia, the Phillipines, Indonesia, Greece, Yugoslavia, Guatemala and Venezuela. These ores normally contain free and combined water and analyze on a dry basis less than 3 weight percent nickel, less than 0.15 weight percent cobalt and more than 15 weight percent iron.

Bauxite is a naturally occurring porous ore having the following nominal composition:

|  | wt. % |
|---|---|
| $Al_2O_3$ | 40–60 |
| $Fe_2O_3$ | 1.5–30 |
| $SiO_2$ | 1–8 |
| $TiO_2$ | 2–4 |
| Water | 12–30 |

Bauxite ores are found in considerable deposits on Kauai in the Hawaiian Islands, in Oregon, Washington, Arkansas, Jamaica, British Guiana, Costa Rica, France, Italy, Yugoslavia, Indonesia and elsewhere throughout the world.

Bauxite and nickel ores are ideally suited as catalysts for the process of the invention and can be used directly as mined and without further upgrading. If desired, these ores may be pretreated by leaching and/or sulfiding in the manner previously described.

Spent bauxite or red mud is ideally suited as a catalyst in the invention process since it is available in large quantities and is relatively inexpensive. Red mud is a by-product obtained in the Bayer aluminum process. This process involves digestion of bauxite in caustic solution, generally sodium hydroxide, usually at elevated temperatures and pressures. Digestion of the ore results in a slurry consisting of a sodium aluminate solution and a caustic-insoluble residue, commonly referred to as spent bauxite or red mud. The red mud or spent bauxite is washed to recover most of its entrained liquor content and is then removed as a by-product from the process. Red mud contains a substantial amount of zeolite desilication product admixed with iron, titanium and/or other materials not normally soluble in caustic. The zeolite material or desilication product generally has a formula expressed in mole ratio of oxides as follows:

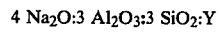

$4\ Na_2O{:}3\ Al_2O_3{:}3\ SiO_2{:}Y$ wherein Y is $SO_3$, Cl, OH, and $CO_2$ depending on the impurities in the liquor from which the zeolite was precipitated.

The quantity of catalyst composition employed in the process will vary over a broad range, depending on the type of reactor system involved. In a typical batch method, the quantity of incorporated catalyst will vary in the range between about 2–20 weight percent, based on the weight of the hydrocarbon feedstock component of the total liquid charge. In a catalyst bed reactor system, a suitable liquid hourly space velocity is one in the range between about 0.5–5 of total liquid charge volume per volume of catalyst per hour.

The total liquid charge may be passed upwardly through a fixed bed of the catalyst in an upflow reactor or may be passed downwardly through a fixed bed of the catalyst in a downflow trickle-bed reactor. The treatment may also be accomplished by passing the liquid charge through an ebullient bed of the catalyst.

The temperature in the reaction zone can be varied in the range between about 500°–1200° F., and preferably is maintained in the range between about 600°–1000° F. The pressure in the reaction system can vary in the range between about 100–3000 psi. An ambient pressure is convenient and practical in most cases.

The following Examples are further illustrative of the present invention. The catalysts and other specific ingredients and processing parameters are presented as being typical, and various modifications can be derived in view of the foregoing disclosure within the scope of the invention.

EXAMPLE I

This Example illustrates the pretreatment of a present invention catalyst composition.

Manganese nodules (50 grams, 14–30 mesh) are slowly heated to 800° F. in a stream of carbon monoxide. The nodules are held at this temperature for 16 hours under the flow of carbon monoxide, and then they are cooled. The nodule mass has changed from brown to black in color and is now magnetic.

The nodules are then heated to a solution of 1 liter of 29 percent ammonium hydroxide, 288 grams of ammonium carbonate, and 350 cubic centimeters of distilled water and stirred at room temperature for 3 hours. The slurry is filtered and the collected nodule solids are washed with distilled water and then dried. Analysis for manganese indicates that approximately 30 percent of the original manganese dioxide contained has been removed from the nodules.

EXAMPLE II

This Example illustrates the invention process as applied to an Arabian light vacuum residual oil.

The feedstock has the following analysis:

| 650° F.+ | |
|---|---|
| H, wt % | 10.67 |
| S, wt % | 3.93 |
| N, wt % | 0.28 |
| CCR, wt % | 16.13 |
| V, ppm | 68 |
| Ni, ppm | 17 |

The residual oil feedstock is blended with an equal volume of tetralin solvent, and fed into the top of a vertical reactor containing a bed of manganese nodule catalysts which is a composition prepared in accordance with the pretreatment of Example I.

The average catalyst temperature during the run is about 725° F. The overall liquid hourly space velocity is about 1.0, and the pressure in the reactor system is approximately in a 1000-1500 psig range.

A liquid effluent is recovered from the bottom of the reactor, and after removal of the solvent and light ends has the following properties:

| 650° F.+ | |
|---|---|
| H, wt % | 11.53 |
| S, wt % | 1.25 |
| N, wt % | 0.25 |
| CCR, wt % | 10.65 |
| V, ppm | 10.3 |
| Ni, ppm | 4.8 |

Similar results are obtained when a 650° F.+ FCC main column bottoms fraction is employed as the hydrogen donor solvent, except that the said solvent remains as a component of the final upgraded feedstock.

Similar results are also obtained if the catalyst is a presulfided bog iron, bog manganese, nickel laterite or spent bauxite. In each case, pretreatment by leaching or sulfiding on the average yields superior results.

What is claimed is:

1. A process for reducing the metal, sulfur and nitrogen content of hydrocarbon feedstock which comprises contacting a mixture of hydrocarbon feedstock and hydrogen donor solvent in the absence of added hydrogen and under liquid phase reaction conditions with a catalyst composition comprising a naturally occurring porous metal ore selected from the group consisting of manganese nodules, bog iron, bog manganese, nickel laterites and bauxite.

2. A catalytic process for reducing the metal, sulfur, nitrogen and Conradson Carbon Residue content of a heavy hydrocarbon feedstock which comprises (1) admixing a heavy hydrocarbon oil with a hydrogen donor solvent in a weight ratio between about 0.2-10 of hydrogen donor solvent to hydrocarbon oil, and (2) contacting the liquid admixture with a catalyst composition at a temperature between about 600°-1000° F. for a period between about 0.1-3 hours, wherein the said catalyst composition comprises a naturally occurring porous metal ore selected from the group consisting of manganese nodules, bog iron, bog manganese, nickel laterites and bauxite.

3. A process in accordance with claim 2 wherein the heavy hydrocarbon feedstock is a petroleum crude oil distillation residuum.

4. A process in accordance with claim 2 wherein the hydrogen donor solvent is selected from TCC syntower bottoms and FCC main column bottoms.

5. A process in accordance with claim 2 wherein the porous metal ore is bog iron.

6. A process in accordance with claim 2 wherein the porous metal ore is bog manganese.

7. A process in accordance with claim 2 wherein the porous metal ore is nickel laterites.

8. A process in accordance with claim 2 wherein the porous metal ore is bauxite.

9. A process in accordance with claim 2 wherein the porous metal ore is manganese nodules.

10. A process in accordance with claim 2 wherein the porous metal ore has been subjected to pretreatment by leaching or sulfiding.

11. A process in accordance with claim 8 wherein the bauxite is spent bauxite or red mud.

12. A process in accordance with claim 9 wherein the manganese nodules have been washed with water having a temperature of at least 125° F. and a total salts content of not more than 1000 parts per million for a time sufficient to increase the accessible surface area of the nodules.

13. A process in accordance with claim 9 wherein the said manganese nodules have a copper, nickel or molybdenum content, and at least a portion of the copper, nickel or molybdenum content has been removed therefrom.

14. A process in accordance with claim 13 wherein at least a portion of the copper or nickel content has been removed from said manganese nodules by leaching said manganese nodules with an aqueous solution of acid.

15. A process in accordance with claim 13 wherein at least a portion of the molybdenum content has been removed from said manganese nodules by leaching said manganese nodules with an aqueous solution of a base.

16. A process in accordance with claim 15 wherein said aqueous solution of a base has a pH of at least 8.

17. A process in accordance with claim 2 wherein hydrogen gas is added to step (2) of the reaction system at least intermittently in a quantity sufficient to regenerate the hydrogen donor solvent.

* * * * *